(12) United States Patent
Inamori et al.

(10) Patent No.: US 11,131,590 B2
(45) Date of Patent: Sep. 28, 2021

(54) STRAIN GAUGE, LOAD SENSOR, AND METHOD FOR MANUFACTURING STRAIN GAUGE

(71) Applicant: Minebea Mitsumi Inc., Nagano (JP)

(72) Inventors: Dohaku Inamori, Nagano (JP); Yosuke Ehara, Nagano (JP); Tadahiko Karaki, Nagano (JP)

(73) Assignee: MINEBEA MITSUMI INC., Nagano (JP)

( * ) Notice: Subject to any disclaimer, the term of this patent is extended or adjusted under 35 U.S.C. 154(b) by 412 days.

(21) Appl. No.: 15/938,161

(22) Filed: Mar. 28, 2018

(65) Prior Publication Data

US 2018/0217016 A1 Aug. 2, 2018

Related U.S. Application Data

(63) Continuation of application No. PCT/JP2016/078622, filed on Sep. 28, 2016.

(30) Foreign Application Priority Data

Sep. 29, 2015 (JP) .................................. 2015-191990
Aug. 31, 2016 (JP) .................................. 2016-169658

(51) Int. Cl.
*G01L 1/22* (2006.01)
*G01B 7/16* (2006.01)
*G01G 3/14* (2006.01)

(52) U.S. Cl.
CPC .............. *G01L 1/2287* (2013.01); *G01B 7/18* (2013.01); *G01G 3/1402* (2013.01); *G01L 1/22* (2013.01)

(58) Field of Classification Search
USPC ...................................................... 73/862.632
See application file for complete search history.

(56) References Cited

U.S. PATENT DOCUMENTS 3,949,603 A * 4/1976 Laimins ............... G01G 3/1404
73/862.622
4,185,496 A * 1/1980 Tisone .................. G01L 1/2287
338/2

(Continued)

FOREIGN PATENT DOCUMENTS

CN 1710375 A 12/2005
CN 201093998 Y 7/2008

(Continued)

OTHER PUBLICATIONS

Chinese Office Action dated Mar. 18, 2020 for corresponding Chinese Application No. 201680056644.X and English translation.

(Continued)

*Primary Examiner* — Eric S. McCall
*Assistant Examiner* — Mohammed E Keramet-Amircolai
(74) *Attorney, Agent, or Firm* — Pearne & Gordon LLP

(57) ABSTRACT

The strain gage includes: a substrate formed from a resin material: a resistor provided on a surface of the substrate; and a fusion layer provided on an opposite surface, to the surface on which the resistor is provided. The fusion layer is a thermoplastic polyimide layer. There is provided the strain gage that has a thickness of as thin as possible and that makes a manufacture process of a load sensor simpler.

18 Claims, 5 Drawing Sheets

(56) References Cited

U.S. PATENT DOCUMENTS

| | | | | |
|---|---|---|---|---|
| 4,299,130 | A | * | 11/1981 | Koneval ............... G01B 7/20 338/2 |
| 4,331,035 | A | * | 5/1982 | Eisele ................... G01B 7/20 73/1.15 |
| 4,511,877 | A | * | 4/1985 | Nishikawa ........... G01L 1/2287 29/621.1 |
| 4,522,067 | A | * | 6/1985 | Burger ................. G01L 1/2287 338/3 |
| 4,785,673 | A | * | 11/1988 | Aumard ............... G01L 1/2243 73/862.632 |
| 4,996,882 | A | * | 3/1991 | Kistler ................. G01B 7/16 73/777 |
| 5,406,124 | A | | 4/1995 | Morita |
| 5,512,713 | A | * | 4/1996 | Naito ................... G01G 3/1412 177/211 |
| 5,539,158 | A | * | 7/1996 | Utsunomiya ......... G01L 1/2243 177/211 |
| 7,118,798 | B2 | | 10/2006 | Goda et al. |
| 7,325,974 | B2 | | 2/2008 | Tanabe et al. |
| 8,314,343 | B2 | | 11/2012 | Inoue et al. |
| 8,931,351 | B2 | * | 1/2015 | Muramatsu ............. G01B 1/00 73/849 |
| 2002/0033283 | A1 | * | 3/2002 | Miura ................... G01L 1/2206 177/229 |
| 2004/0247907 | A1 | | 12/2004 | Goda et al. |
| 2005/0160837 | A1 | * | 7/2005 | Tellenbach ........... G01L 1/2287 73/862.625 |
| 2005/0163461 | A1 | * | 7/2005 | Ziebart ................. G01G 3/1402 385/147 |
| 2006/0025257 | A1 | | 2/2006 | Tanabe et al. |
| 2007/0006669 | A1 | * | 1/2007 | Steprath ................ G01L 5/136 73/862.627 |
| 2009/0084596 | A1 | * | 4/2009 | Inoue .................... H01L 24/82 174/261 |
| 2013/0326863 | A1 | * | 12/2013 | Menassa ............. H05K 1/0268 29/621.1 |
| 2016/0169658 | A1 | * | 6/2016 | Seel ..................... G01S 3/784 250/340 |
| 2016/0211425 | A1 | | 7/2016 | Tsujimoto et al. |

FOREIGN PATENT DOCUMENTS

| | | |
|---|---|---|
| CN | 102818516 A | 12/2012 |
| CN | 104792715 A | 7/2015 |
| EP | 0 087 665 A2 | 9/1983 |
| JP | S61-176803 A | 8/1986 |
| JP | 04-350947 A | 12/1992 |
| JP | 06218880 A | 8/1994 |
| JP | 07166148 A | 6/1995 |
| JP | 2651556 B2 | 9/1997 |
| JP | 11302809 A | 11/1999 |
| JP | 2003-136632 A | 5/2003 |
| JP | 2005214970 A | 8/2005 |
| JP | 2009-168505 A | 7/2009 |
| JP | 2010151571 A | 7/2010 |
| JP | 2010-177713 A | 8/2010 |
| JP | 2010-201625 A | 9/2010 |
| JP | 2010-243192 A | 10/2010 |
| JP | 2012-220708 A | 11/2012 |
| JP | 2013-234949 A | 11/2013 |
| JP | 2014085259 A | 5/2014 |
| WO | 87/03684 A1 | 6/1987 |
| WO | 2015/030237 A1 | 3/2017 |

OTHER PUBLICATIONS

Notice of Reasons for Rejection dated Apr. 2, 2019 for corresponding Japanese Application No. 2016-169658.
Extended European Search Report dated Mar. 20, 2019 for corresponding European Application No. 16851630.0.
First Chinese Office Action dated Jul. 15, 2019 for corresponding Chinese Application No. 201680056644.X and English translation.
Notice of Reasons for Rejection dated Oct. 2, 2018 for corresponding Japanese Application No. 2016-169658.
English Translation of the Written Opinion of the International Searching Authority for International Application No. PCT/JP2016/078622 dated Dec. 20, 2016.
International Preliminary report on Patentability for International Application No. PCT/JP2016/078622 dated Apr. 3, 2018.
International Search Report for International Application No. PCT/JP2016/078622 dated Dec. 20, 2016.
Written Opinion of the International Searching Authority for International Application No. PCT/JP2016/078622 dated Dec. 20, 2016.
Notification of Reasons for Refusal dated Oct. 6, 2020 for corresponding Japanese Application No. 2019-103613 and English translation.
Decision of Rejection dated Dec. 3, 2020 for corresponding Chinese Application No. 201680056644.X and English translation.
Office Action dated May 28, 2021 for corresponding European Patent Application No. 16851630.0.
Notice of Reason for Refusal dated Aug. 3, 2021 for corresponding Japanese Application No. 2019-103613 and English translation.

* cited by examiner

STRAIN GAUGE, LOAD SENSOR, AND METHOD FOR MANUFACTURING STRAIN GAUGE

CROSS REFERENCE TO RELATED APPLICATION

This application is a continuation application of International Patent Application No. PCT/JP2016/078622 filed on Sep. 28, 2016 claiming the benefit of priority of Japanese Patent Applications No. 2015-191990 filed on Sep. 29, 2015 and No. 2016-169658 filed on Aug. 31, 2016. The contents of International Patent Application No. PCT/JP2016/078622 and Japanese Patent Applications No. 2015-191990 and No. 2016-169658 are incorporated herein by reference in their entities.

BACKGROUND

The present disclosure relates to a strain gage (gauge) including a thermoplastic polyimide (TPI) layer as a fusion layer, a load sensor including the strain gage, and a manufacturing method of the strain gage.

A load sensor used, for example, for measuring weight of an object mainly includes a flexure element and a strain gage. The flexure element, which is typically made of metal such as aluminum alloy, gets deformed or strains depending on the weight of the object to be measured. The strain gage typically includes an insulating plate-like substrate and a resistor or resistive element provided on a surface of the substrate. An another surface of the substrate is fixed to a surface of the flexure element with adhesive. The deformation or strain in the flexure element causes the resistor of the strain gage to contract, which changes an electrical resistance value of the resistor. The weight of the object to be measured is determined based on the change in the electrical resistance value of the resistor. Japanese Patent Application Laid-open No. 2014-85259 discloses an exemplary strain sensor.

SUMMARY

In order to prevent a creep phenomenon which would decrease strain following capability and to transmit the strain satisfactorily, the load sensor is desired to include a thin strain gage while maintaining the insulation property and adhesion property between the resistor and the flexure element.

In the manufacture of the above load sensor, thermosetting adhesive is typically used to adhere the strain gage to the flexure element. In the adhesion process of the strain gage to the flexure element, the strain gage is coated with adhesive, and then the strain gage coated with the adhesive and the flexure element are held integrally by using a jig in a state where the strain gage is in contact with the flexure element, thereby pressurizing and holding a contact surface between the strain gage and the flexure element. Subsequently, the strain gage and the flexure element that are held integrally are put in a furnace to cure the adhesive by heating. After the heating, the strain gage and the flexure element are taken out of the furnace, the jig is removed from therefrom, and excess adhesive is removed from the contact surface between the strain gage and the flexure element.

The above-described steps for manufacturing the load sensor by use of adhesive are complicated and time-consuming, and thus there is a demand that the manufacturing steps are simplified to enhance manufacturing efficiency.

An object of the present disclosure is to solve the above problems and to provide a strain gage that has a thickness of as thin as possible and that makes a manufacture process of a load sensor simpler, the load sensor provided with the strain gage, and a manufacturing method for the strain gage.

According to a first aspect of the present disclosure, there is provided a strain gage, including:
a substrate formed from a resin material;
a resistor provided on a surface of the substrate; and
a fusion layer provided on an opposite surface to the surface on which the resistor is provided,
wherein the fusion layer is a thermoplastic polyimide layer.

According to a second aspect of the present disclosure, there is provided a load sensor including a flexure element and the strain gage as defined in the first aspect which is attached to the flexure element.

According to a third aspect of the present disclosure, there is provided a method for manufacturing a strain gage, including:
forming resistors on a surface of a substrate formed from a resin material;
forming a fusion layer, which is a thermoplastic polyimide layer, on another surface of the substrate; and
cutting the substrate to obtain strain gages each of which includes the resistor on the surface of the substrate cut and the fusion layer on the another surface of the substrate cut.

EMBODIMENTS

Referring to FIGS. 1 to 6, an embodiment of a strain gage according to the present disclosure is explained.

Figure 1:
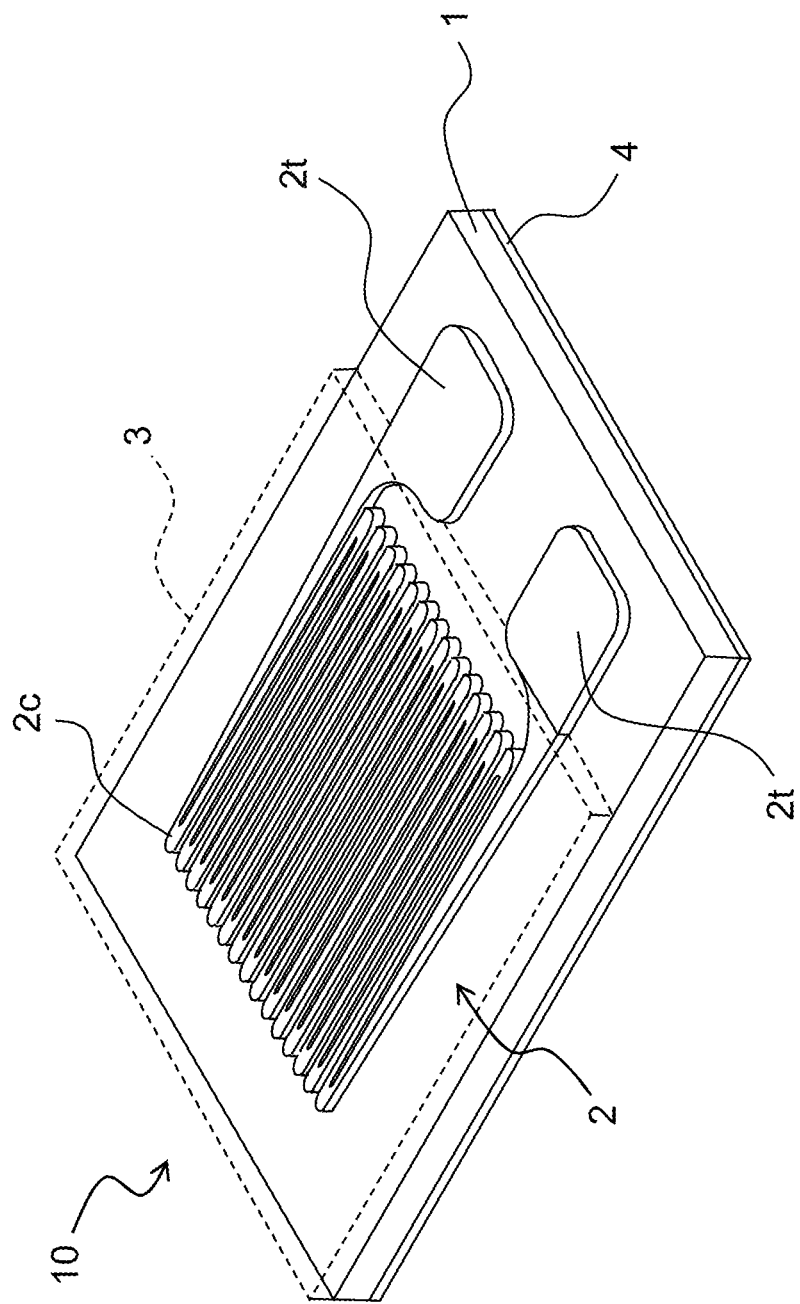
FIG. 1 is a perspective view of a strain gage according to an embodiment of the present disclosure.

As depicted in FIG. 1, a strain gage 10 according to the embodiment mainly includes a substrate or base member 1, a resistor or resistive element 2 provided on a surface of the substrate 1, a cover 3 covering the resistor 2, and a fusion layer 4 provided on an another surface of the substrate 1.

The substrate 1 is a plate-like member formed from a resin material and having flexibility. More specifically, the substrate 1 is a plane-parallel plate. The resin material is preferably a polyimide (PI) resin, and in the following, the substrate 1 is explained as a polyimide substrate. The resin material, however, may be polyamideimide (PAI), polyethylene (PE), polyetheretherketone (PEEK), or the like. The thickness of the substrate 1 is, for example, in a range of approximately 12 μm to approximately 25 μm.

The resistor 2 is a metal layer formed, for example, from copper-nickel alloy. The resistor 2 includes a pair of tabs 2t to which lead wires for external connection are connected and a gage sensing part 2c extending zigzag from one of the tabs 2t to the other of the tabs 2t.

The cover 3 is provided on the resistor 2 to cover only the gage sensing part 2c of the resistor 2, thus preventing damage and the like in the gage sensing part 2c. Although the cover 3 may be formed, for example, from polyimide, the cover 3 may be formed from the above-described PAI, PE, PEEK, or the like. In FIG. 1, the cover 3 is depicted by dashed lines to show the gage sensing part 2c of the resistor 2 clearly.

Figure 2:
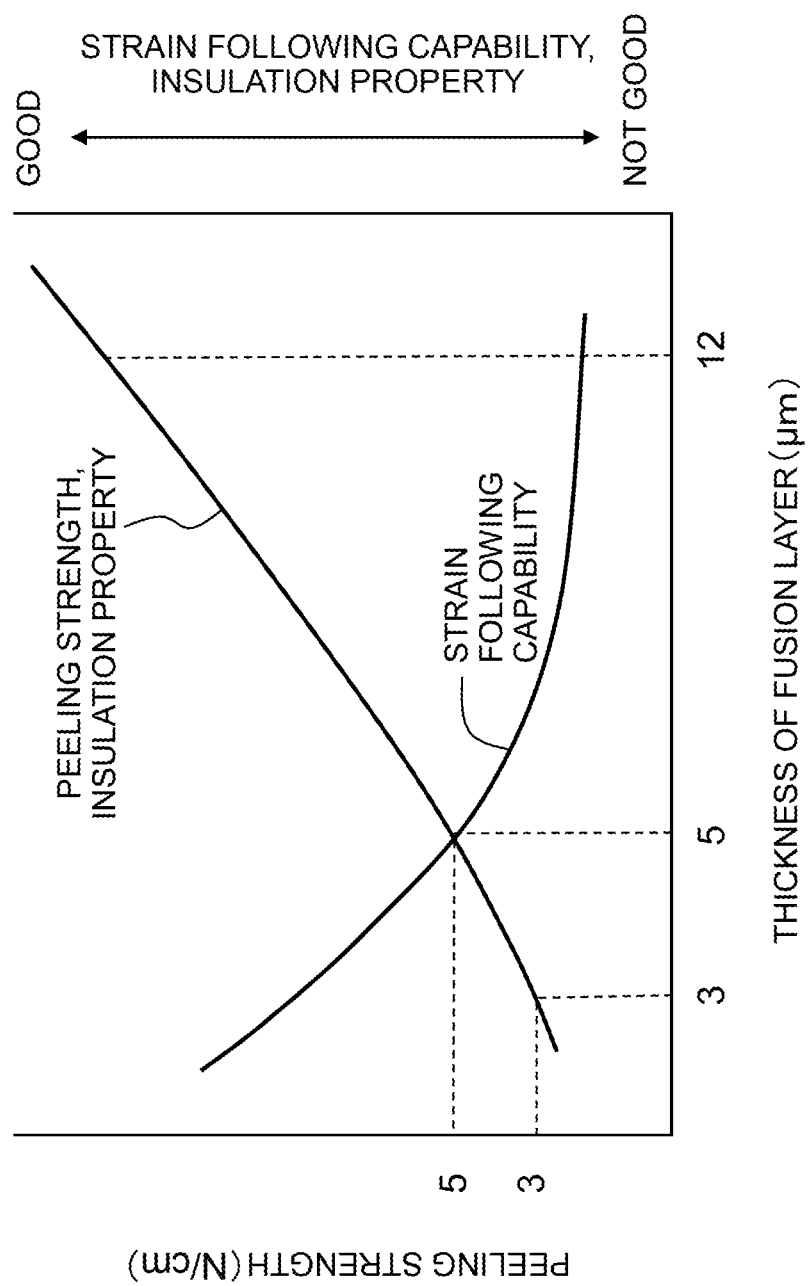
FIG. 2 is a graph indicating a relation between thickness of a fusion layer and properties of the strain gage.

The fusion layer 4 is a thermoplastic polyimide layer that is formed (laminated) on an opposite surface, of the substrate 1, which is a surface opposite to the surface on which the resistor 2 is formed. The thickness of the fusion layer 4 is preferably in a range of 3 µm to 12 µm. For example, the thickness of the fusion layer 4 can be 5 µm. The reason why the above numerical range is preferred is explained below with reference to FIG. 2. FIG. 2 is a graph indicating a relation between thickness of the fusion layer of the strain gage and properties of the strain gage (a peeling strength, an insulation property, and a strain following capability) when the strain gage 10 is adhered to the flexure element 20 subjected to surface roughening described later. When the thickness of the fusion layer 4 is 3 µm, the peeling strength is 3 N/cm. The fusion layer 4 having a thickness of equal to or less than 3 µm can not achieve the fixation of the strain gage 10 to the flexure element 20 (FIG. 6) with sufficient peeling strength. Further, in the present disclosure, the fusion layer 4 (the thermoplastic polyimide layer) and the substrate 1 (the polyimide substrate) function to insulate the resistor 2 from the flexure element 20. Thus, if the thickness of the fusion layer 4 (the thermoplastic polyimide layer) is too thin, the insulation property is liable to be low. FIG. 2 indicates the insulation property with an arbitrary scale, showing that the insulation property tends to increase, similarly to the peeling strength, as the thickness of the fusion layer 4 is larger. When the thickness of the fusion layer 4 is larger than 12 µm, the adhesion strength further increases by being influenced by the surface roughening of the flexure element 20. In that case, however, the strain following capability (such as the strain following capability related to creep characteristics) could not be obtained sufficiently.

In a case that the fusion layer 4 is fusion-bonded to the flexure element 20 subjected to the surface roughing as described later, the thickness of the fusion layer 4 may be equal to or more than surface roughness of the flexure element 20. When the thickness of the fusion layer 4 is less than the surface roughness of the flexure element 20, the fusion layer 4 may not reach the bottom of concave portions of convexities and concavities of the flexure element 20, thus making the adhesion strength between the fusion layer 4 and the flexure element 20 insufficient and/or undermining reliability as indicated in Examples described later.

The thermoplastic polyimide layer may contain a resin and/or filler other than the thermoplastic polyimide, in addition to the thermoplastic polyimide. Since the thermoplastic polyimide is expensive, the thermoplastic polyimide layer that contains an inexpensive resin and/or filler can reduce raw material costs of the strain gage.

Examples of the resin other than the thermoplastic polyimide include an epoxy resin, a phenol resin, and an oxetane resin. Further, the resin other than the thermoplastic polyimide may be an engineering plastic, such as polybutylene terephthalate (PBT), polyphenylene sulfide (PPS), polyether sulfone (PES), or polyetherimide (PEI).

The thermoplastic polyimide layer containing the epoxy resin can be obtained by mixing polyamide acid with the epoxy resin and heating the mixture. The thermoplastic polyimide layer containing the epoxy resin obtained as described above has an advantage of having the adhesion strength higher than that of the thermoplastic polyimide layer containing no epoxy resin, as indicated in Reference Examples described below.

Examples of the filler include inorganic fine particles of aluminum oxide, titanium oxide, boron nitride, and silicon oxide. As indicated in the Reference Examples described below, a linear expansion coefficient of the fusion layer 4 can be adjusted by allowing the thermoplastic polyimide layer to contain the inorganic fine particles in an appropriate ratio. The thickness of the fusion layer 4 of the strain gage 10 according to this embodiment is larger than the thickness of adhesive of conventional strain gages. Further, the heating temperature (fusion temperature) of the fusion layer 4 when the strain gage 10 according to this embodiment is attached to the flexure element 20 is higher than the heating temperature of the adhesive when the conventional strain gage is attached to the flexure element. Those facts would easily cause residual stress in the fusion layer 4 of the strain gage 10 according to this embodiment attached to the flexure element 20. In order to prevent that problem, the linear expansion coefficient of the fusion layer 4 is preferably made to be a value close to a linear expansion coefficient of the flexure element 20. In this respect, it is preferable to use the thermoplastic polyimide layer that contains the inorganic fine particles as a material of the fusion layer 4 of the strain gage 10 according to this embodiment because the linear expansion coefficient of the thermoplastic polyimide layer that contains the inorganic fine particles can be adjusted by the blending amount of inorganic fine particles.

Subsequently, a manufacturing method of the strain gage 10 according to this embodiment is explained in accordance with a flowchart indicated in FIG. 3.

Figure 3:
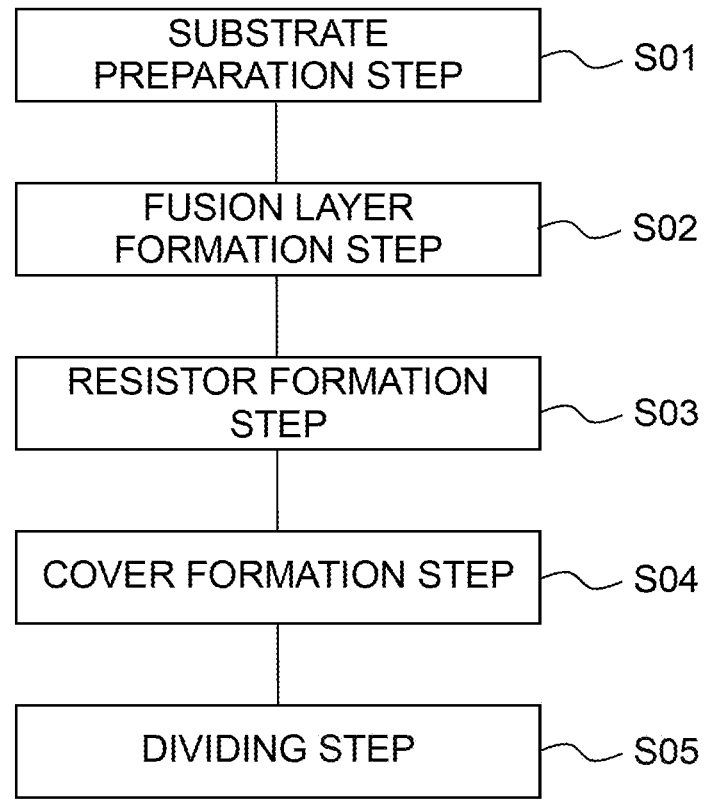
FIG. 3 is a flowchart indicating manufacturing steps of the strain gage.

As indicated in FIG. 3, the manufacturing method of the strain gage 10 according to this embodiment includes: a substrate preparation step (S01) of forming the polyimide resin layer having a surface provided with metallic foil; a fusion layer formation step (S02) of forming the fusion layer 4 on a surface, of the polyimide substrate, on a side opposite to the surface provided with the metallic foil; a resistor formation step (S03) of forming multiple resistors 2 from the metallic foil on the polyimide substrate; a cover formation step (S04) of covering each of the resistors 2 with the cover 3; and a dividing step (S05) of cutting the substrate into multiple strain gages 10.

In the substrate preparation step S01, for example, the metallic foil is coated with polyimide and then the metallic foil coated with the polyimide is baked, thus forming the polyimide substrate. Accordingly, the plate-like polyimide substrate having the surface provided with the metallic foil is formed.

In the fusion layer formation step S02, for example, a surface, of the polyimide substrate, on a side opposite to the surface provided with the metallic foil is coated with thermoplastic polyimide varnish, then the thermoplastic polyimide varnish is baked. Accordingly, the fusion layer 4 that is the thermoplastic polyimide layer is formed on the polyimide substrate. The thermoplastic polyimide varnish may contain a resin and/or filler other than the thermoplastic polyimide. Thermoplastic polyamide acid varnish may be used instead of the thermoplastic polyimide varnish. In the resistor formation step S03, multiple resistors 2 are formed from the metallic foil by photolithography. In the cover formation step S04, the gage sensing part 2c of each of the resistors 2 formed on the substrate is covered with the cover 3 made of polyimide. In the dividing step S05, the substrate is cut depending on arrangement of the resistors 2 to obtain multiple strain gages 10 each including the substrate 1, the resistor 2, the cover 3 and the fusion layer 4.

Subsequently, a method of manufacturing a load sensor by attaching the strain gage 10 according to this embodiment to the flexure element 20 (FIG. 6) is explained.

Figure 4:
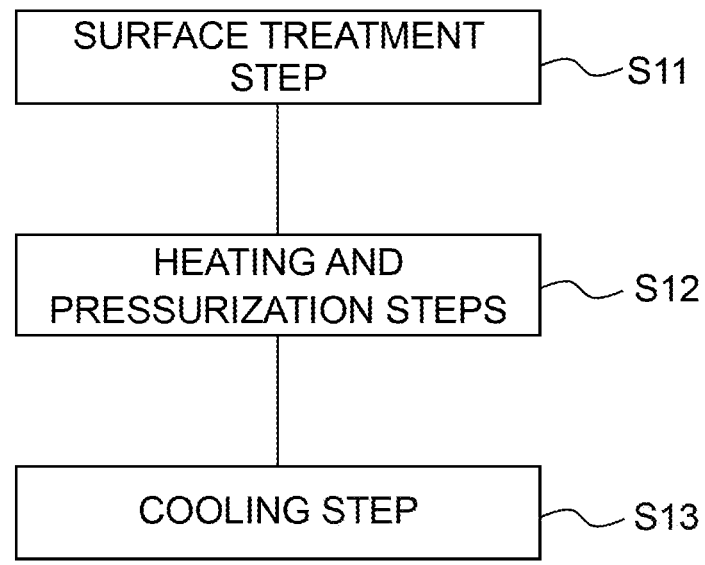
FIG. 4 is a flowchart indicating manufacturing steps of a load sensor in which the strain gage is attached to a flexure element.
Figure 5:
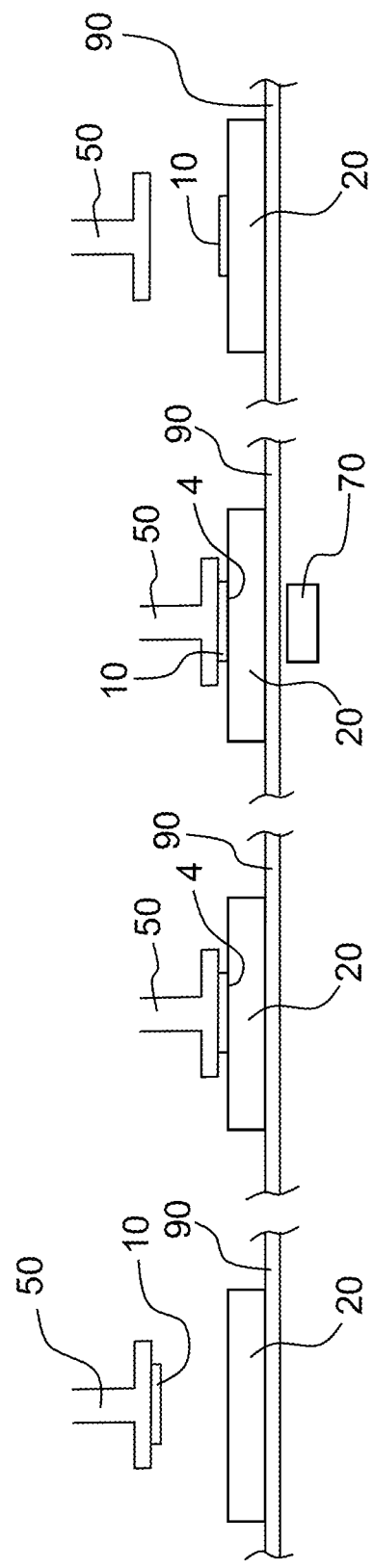
FIGS. 5A to 5D are illustrative views depicting a process in which the strain gage is attached to the flexure element.

As indicated in the flowchart of FIG. 4, the step of attaching the strain gage 10 to the flexure element 20 includes: a surface treatment step (S11) of forming concavities and convexities in a surface of the flexure element 20; heating and pressurization steps (S12) of fusing the strain gage 10 to bond to the flexure element 20; and a cooling step (S13) of air-cooling the strain gage 10 and the flexure element 20 fixed to each other.

The flexure element 20 can be formed from metal, such as aluminum alloy. The flexure element 20 is not limited to the plate-like member depicted in FIG. 6 and may have various shapes such as a Roberval shape and a ring shape. The number of the strain gages 10 attached to the flexure element 20 is not limited to one and may be an arbitrary number.

In the surface treatment step S11, the surface roughening is performed on a portion, of the flexure element 20, to which the strain gage 10 is to be fusion-bonded. The surface roughing, such as sandblasting, laser blasting, or a chemical etching, forms fine concavities and convexities on the surface of the flexure element 20. The surface roughness Ra of the portion of the flexure element 20 is, for example, approximately 5 μm. The surface roughness Ra preferably has a center value of approximately 5 μm, and the surface roughness Ra is preferably in a range of 3 to 7 μm. Then, the portion subjected to the surface roughing is washed or cleaned. This forms fine concavities and convexities on the surface of the flexure element 20 to enlarge a contact area of the flexure element 20 with the fusion layer 4 of the strain gage 10, thus making it possible to fusion-bond the strain gage 10 to the flexure element 20 with higher adhesion strength.

In the heating and pressurization steps S12, as described in detail below, heating and pressurization are performed to fusion-bond the strain gage 10 to the flexure element 20 in a state where the fusion layer 4 of the strain gage 10 is in contact with the portion of the flexure element 20 subjected to the surface roughening. FIGS. 5A to 5D depict a series of specific processes of performing the heating and pressurization steps S12. At first, as depicted in FIG. 5A, the strain gage 10 held by a jig 50 is made close to the flexure element 20 placed on a conveyer 90. Then, as depicted in FIG. 5B, the fusion layer 4 of the strain gage 10 is brought into contact with the flexure element 20.

Next, as depicted in FIG. 5C, the flexure element 20 is locally heated by an instantaneous heating device 70 placed below the conveyer 90 such that a part of the flexure element 20, namely, a portion, of the flexure element 20, which is in contact with the fusion layer 4 of the strain gage 10 is heated. At the same time as when the heating is performed, the strain gage 10 is pressed against the flexure element 20 by moving the jig 50 further downward, thus bringing the fusion layer 4 of the strain gage 10 into contact under pressure with the surface of the flexure element 20 subjected to the surface roughening. This melts the thermoplastic polyimide forming the fusion layer 4, and the melted thermoplastic polyimide enters fine concave portions in the surface of the flexure element 20 that are formed in the surface treatment step S11.

The heating temperature is, for example, in a range of approximately 220° C. to approximately 260° C. The pressurizing force is, for example, in a range of approximately 1 N/m$^2$ to approximately 2 N/m$^2$. The time during which the heating and pressurization are performed is, for example, in a range of approximately 5 seconds to approximately 20 seconds.

In the air-cooling step S13, as depicted in FIG. 5D, the holding of the strain gage 10 by use of the jig 50 is released to air-cool the strain gage 10 and the flexure element 20. This solidifies the thermoplastic polyimide forming the fusion layer 4, thus the strain gage 10 is fusion-bonded to the flexure element 20 with high adhesion strength.

Figure 6:
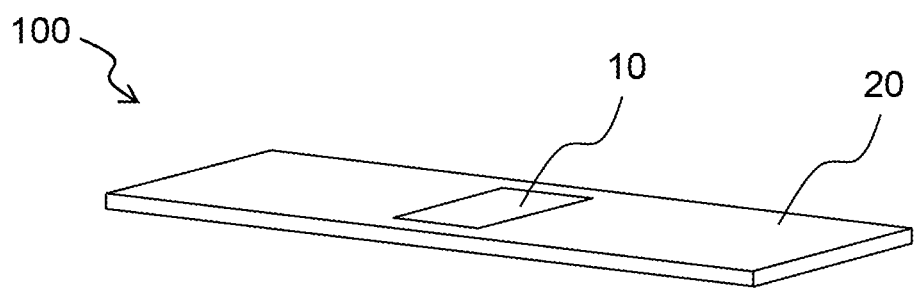
FIG. 6 is a perspective view of the load sensor according to the embodiment of the present disclosure.

Accordingly, it is possible to manufacture a load sensor 100, as depicted in FIG. 6, including the flexure element 20 and the strain gage 10 attached to a part of the flexure element 20.

As described above, the attaching method of the strain gage 10 according to this embodiment can fix the strain gage 10 to the flexure element 20 with high adhesion strength by performing the heating and the pressurization at the same time in the state where the fusion layer 4 of the strain gage 10 is in contact with the flexure element 20 and by cooling the strain gage 10 and the flexure element 20. Thus, it is possible to efficiently perform the attachment of the strain gage 10 to the flexure element 20 in a short time compared to conventional steps that use thermosetting adhesive and that include a coating step of coating the strain gage with adhesive and an adhesive removal step of removing excess adhesive from the contact surface between the strain gage and the flexure element.

In the attachment method of the strain gage 10 according to this embodiment, the strain gage 10 is fusion-bonded to the flexure element 20 by selectively heating only the vicinity of the contact surface between the flexure element 20 and the fusion layer 4 of the strain gage 10 by use of the instantaneous heating device 70. Thus, in the attachment method according to this embodiment, an amount of energy required for the heating can be greatly reduced compared to conventional steps in which the strain gage and the flexure element fixed to each other by use of the jig are placed in a furnace to heat all of the strain gage, the flexure element, and the jig at a temperature equal to or more than 150° C. for over an hour.

The fusion layer 4 of the strain gage 10 according to this embodiment can be fused to bond to the flexure element 20 by performing the heating and pressurization in a short time. This enables the attachment process of attaching the strain gage 10 to the flexure element 20 to be achieved as a one-piece flow process using the jig 50 and the instantaneous heating device 70. The one-piece-flow attachment process is simpler than conventional heating and pressurization process performed as a batch process that includes a heating step for over an hour (i.e., conventional heating and pressurization process including: pressurizing the contact surface between the strain gage and the flexure element while integrally holding the strain gage and the flexure element by use of the jig; heating the strain gage and the flexure element that are integrally held by the jig in a furnace; taking the strain gage and the flexure element out of the furnace after the heating; and removing the jig from the strain gage and the flexure element).

As an example of deterioration in the strain following capability, there is a creep phenomenon caused by a gradual decrease, with time, in a strain amount of a portion, of the substrate of the strain gage attached to the flexure element, away from the flexure element, namely, an amount of elastic deformation (strain amount) of the surface that is provided with the resistor and positioned on the side opposite to the surface to which the flexure element is adhered. In order to prevent the creep phenomenon, it is desired that the thickness of the substrate be small to place the resistor as close as possible to the flexure element.

Meanwhile, the resistor and the flexure element are conductors. Thus, the resistor is required to be insulated from the flexure element by the substrate which is dielectric. In this situation, making the thickness of the substrate excessively small for the purpose of preventing the creep phenomenon might lead to the broken insulation and consequently to a damaged load sensor.

The strain gage 10 according to this embodiment has a layered structure including the substrate 1 formed from the polyimide and the fusion layer 4 that is the thermoplastic polyimide layer placed on the surface, of the substrate 1, on the side opposite to the surface provided with the resistor 2. In that structure, even when the thickness of the substrate 1 formed from the polyimide is small, the layered structure including the substrate 1 and the fusion layer 4 can insulate the resistor 2 from the flexure element 20 satisfactorily. Accordingly, the strain gage 10 according to this embodiment has an effect that the substrate 1 is allowed to have a small thickness to prevent the creep phenomenon while the resistor 2 is satisfactorily insulated from the flexure element 20.

In other words, the strain gage 10 according to this embodiment has a structure in which a part of the polyimide substrate is replaced by the fusion layer that is the thermoplastic polyimide layer. This allows the strain gage 10 according to this embodiment to reduce the thickness of the substrate 1 to prevent the creep phenomenon as well as to maintain the insulation property by virtue of the layered structure formed from the substrate 1 and the fusion layer 4 that is the thermoplastic polyimide layer, and further enables the efficient adhesion of the strain gage 10 to the flexure element 20 by use of the fusion layer 4.

In the strain gage 10 according to this embodiment, the substrate 1 is formed from the polyimide and the fusion layer 4 is formed from the thermoplastic polyimide. Since the polyimide and the thermoplastic polyimide are polyimide-based materials, they are compatible and adhered to each other with high adhesion strength. Thus, there is an effect that, in a state where the strain gage 10 is attached to the flexure element 20, the substrate 1 of the strain gage 10 is fixed to the flexure element 20 with high adhesion strength. Similar to the thermoplastic polyimide, the PAI, PE, and PEEK also have sufficient adhesion strength and insulation property, and thus the substrate 1 can be formed from those materials instead of the polyimide. Any other resin material having sufficient adhesion strength between itself and the thermoplastic polyimide can be used instead of the polyimide.

In the strain gage 10 according to this embodiment, the thickness of the substrate is thin. This makes a thickness of the strain gage 10, not counting a thickness of the fusion layer 4, be smaller than a thickness of the conventional strain gage that has no fusion layer and is attached to the flexure element by using adhesive. Thus, when comparing a case in which the strain gage 10 according to this embodiment is attached to the flexure element 20 via the fusion layer 4 with a case in which the conventional strain gage is attached to the flexure element by using adhesive, the thickness of the strain gage 10 according to this embodiment is thinner than the total thickness of the conventional strain gage and the adhesive.

The fusion layer 4 of the strain gage 10 according to this embodiment is formed from the thermoplastic polyimide. Thus, unlike the thermosetting adhesive, the fusion layer 4 can be preserved semipermanently at normal temperature. This makes it easy to preserve and handle the strain gage 10 according to this embodiment.

In the manufacturing method of the strain gage 10 according to this embodiment, the fusion layer formation step S04 is performed before the dividing step S05, thus collectively forming the fusion layers 4 of the strain gages 10 in one operation. This makes it possible to efficiently manufacture each strain gage 10 having the fusion layer 4.

In the strain gage 10 according to this embodiment, the cover 3 is formed from the polyimide. The cover 3, however, can be formed from any other material. Specifically, the cover 3 may be formed, for example, from the thermoplastic polyimide.

In the attachment method according to this embodiment, heating is performed from the flexure element 20 side when the strain gage 10 is fused to bond to the flexure element 20. The heating, however, may be performed from the strain gage 10 side. Specifically, for example, the jig 50 may be provided with a heater to perform both the heating and pressurization. Or, the heating and pressurization steps S12 may be performed by placing, in a furnace, the strain gage 10 and the flexure element 20 held in a pressurized state by use of the jig.

The attachment method according to this embodiment need not include the surface treatment step.

EXAMPLES

The strain gage and the load sensor according to the present disclosure are explained by Examples. The present invention, however, is not limited to those.

Example 1

In Example 1, strain gages were manufactured as follows. At first, metallic foil was coated with polyimide varnish by a cast method, and the metallic foil coated with the polyimide varnish was baked. Accordingly, a polyimide substrate having a surface provided with the metallic foil was obtained. Next, a surface, of the polyimide substrate, on a side opposite to the surface provided with the metallic foil was coated with thermoplastic polyimide varnish by the cast method, and the thermoplastic polyimide varnish was baked. Accordingly, a fusion layer having a thickness of 4 μm was formed. A resist pattern was formed on the metallic foil by photolithography and then the metallic foil was etched. Accordingly, resistors are formed on the polyimide substrate. Further, a gage sensing part of each resistor was coated with the polyimide varnish to form a cover. The polyimide substrate was cut depending on arrangement of the resistors, thus obtaining the strain gages.

The strain gage obtained was used to manufacture a load sensor, as follows. A surface of an aluminum substrate, having a thickness of 1 mm and used as a flexure element, was subjected to surface roughing by laser blasting, and then washed or cleaned. The surface roughness of the surface subjected to the surface roughing was 7 μm, which was measured by a surface roughness measuring apparatus (a stylus-type (contact-type) surface roughness measuring apparatus, SURFCOM series, produced by TOKYO SEIMITSU CO., LTD.). The surface roughness measured was a maximum height roughness (Rz). The strain gage was held by a jig, and the fusion layer of the strain gage was brought into contact with a portion of the flexure element subjected to the surface roughing. Under that condition, the contact portion of the fusion layer with the flexure element was heated at 270° C. for 13 seconds by a heater placed below the flexure element while the contact portion was pressurized with a pressure of 30 kgf/cm². Subsequently, the holding of the strain gage by the jig was released to air-cool the strain gage and the flexure element. This caused the strain gage to be fusion-bonded to the flexure element, obtaining the load sensor.

Example 2

The strain gages were manufactured similarly to Example 1, except that the thermoplastic polyimide varnish was applied in an amount that the fusion layer having a thickness of 9 μm was obtained after the baking. Further, the load sensor was manufactured similarly to Example 1.

<Reliability Test>

Sixteen load sensors were made in Example 1 and 15 load sensors were made in Example 2, and those load sensors were subjected to measurement of zero balance. Then, artificial sweat liquid was applied around each strain gage and left for 24 hours under normal temperature and humidity. After each load sensor was exposed to environment with high temperature and humidity for a week, the zero balance of the load sensor was measured to determine the difference (the variation) from an initial value. The measurement of zero balance means measurement of output voltage of the load sensor at a time when rated application voltage is applied thereto under environment with no load.

In Example 1, four out of the 16 load sensors had a variation in zero balance exceeding 0.025 mV. In Example 2, among the 15 load sensors, there was no load sensor that had a variation in zero balance exceeding 0.025 mV. It can be considered that, the bottom of concaves of convexities and concavities of the flexure element in Example 1 was not filled with the material of the fusion layer due to the thickness of the fusion layer of the load sensor in Example 1 that was smaller than the surface roughness of the flexure element, thereby allowing the artificial sweat liquid to enter a gap between the flexure element and the fusion layer. Meanwhile, it can be considered that the bottom of concaves of convexities and concavities of the flexure element in Example 2 was filled sufficiently with the material of the fusion layer due to the thickness of the fusion layer of the load sensor in Example 2 that was larger than the surface roughness of the flexure element.

Reference Example 1

The thermoplastic polyimide varnish or thermoplastic polyamide acid varnish that was a precursor of the thermoplastic polyimide was blended with a bisphenol A epoxy compound so that the weight ratio of bisphenol A epoxy resin had each value indicated in Table 1. Similarly, the thermoplastic polyimide varnish or thermoplastic polyamide acid varnish was blended with a bisphenol F epoxy compound so that the weight ratio of bisphenol F epoxy resin had each value indicated in Table 2. Further, the thermoplastic polyimide varnish or thermoplastic polyamide acid varnish was blended with TEPIC (trade name) produced by NISSAN CHEMICAL INDUSTRIES, LTD., as an epoxy compound so that the weight ratio of TEPIC had each value indicated in Table 3.

Each composition obtained was applied on a glass plate (JIS R3203), heated at 120° C. for 20 minutes, and heated at 200° C. for 10 minutes.

The properties of the composition after the heating are shown in Tables 1 to 3. In the tables, a case in which the composition after the heating was cured completely to be not tacky (have no tackiness) is indicated as "+" (satisfactory), and a case in which the composition after the heating was tacky (had a tackiness) is indicated as "−" (unsatisfactory). In the tables, "N/A" means not available.

TABLE 1

| | Blending amount of bisphenol A epoxy resin (wt %) | | | | | |
| --- | --- | --- | --- | --- | --- | --- |
| | 10 | 30 | 50 | 75 | 85 | 90 |
| Polyimide | − | − | − | N/A | N/A | N/A |
| Polyamide acid | + | + | + | + | + | − |

TABLE 2

| | Blending amount of bisphenol F epoxy resin (wt %) | | | | | |
| --- | --- | --- | --- | --- | --- | --- |
| | 10 | 30 | 50 | 75 | 85 | 90 |
| Polyimide | − | − | − | N/A − | N/A | N/A |
| Polyamide acid | + | + | + | + | + | − |

TABLE 3

| | Blending amount of TEPIC (wt %) | | |
| --- | --- | --- | --- |
| | 10 | 30 | 50 |
| Polyimide | − | − | − |
| Polyamide acid | + | − | − |

As indicated in Tables 1 to 3, when the thermoplastic polyimide varnish was blended with the epoxy compound, the composition was tacky after the heating regardless of the blending amount of the epoxy compound. When the thermoplastic polyamide acid varnish was blended with the epoxy compound, the composition was completely cured to be not tacky by making the blending amount of the epoxy compound an appropriate value. A resin layer (thermoplastic polyimide layer) obtained by blending the thermoplastic polyamide acid varnish with the epoxy compound and curing the composition, contained the thermoplastic polyimide and the epoxy resin.

In order to cure (imidize) the thermoplastic polyamide acid varnish, the thermoplastic polyamide acid varnish is typically required to be heated at 300° C. In this Reference Example, it is assumed that the epoxy resin added reacted with the polyamide acid to proceed the curing reaction at a low temperature of approximately 200° C.

The cured composition in which the thermoplastic polyamide acid varnish was blended with 10 to 85 wt % of the bisphenol A epoxy compound, the cured composition in which the thermoplastic polyamide acid varnish was blended with 10 to 85 wt % of the bisphenol F epoxy compound, and the cured composition in which the thermoplastic polyamide acid varnish was blended with 10 wt % of TEPIC, each of which was not tacky, were scratched by needles, and whether each cured composition was peeled off from the glass plate was examined. Further, the thermoplastic polyimide layer was formed by coating the glass plate with the thermoplastic polyimide varnish and curing it through heating at 200° C. for 30 minutes. Similarly, the thermoplastic polyimide layer was formed by coating the glass plate with the thermoplastic polyamide acid varnish and curing it through heating at 300° C. for 60 minutes. Those thermoplastic polyimide layers were scratched by needles, and whether each layer was peeled off from the glass plate was examined.

As a result, although the thermoplastic polyimide layer formed only from the thermoplastic polyimide varnish and the thermoplastic polyimide layer formed only from the thermoplastic polyamide acid varnish were peeled off from the glass plates, the thermoplastic polyimide layer containing the epoxy resin that was obtained by the composition in which the thermoplastic polyamide acid varnish was blended with the epoxy compound was not peeled off from the glass plate. This result shows that the thermoplastic polyimide layer containing the epoxy resin had the adhesion strength to the glass higher than that of the thermoplastic polyimide layer containing no epoxy resin. Accordingly, it is presumed that the adhesion strength of the fusion layer to the flexure element formed from metal such as aluminum is improved by allowing the thermoplastic polyimide layer (fusion layer) to contain the epoxy resin.

Reference Example 2

The linear expansion coefficients of thermoplastic polyimide layers containing the filler, each of which could be obtained by curing the composition including the thermoplastic polyamide acid varnish or the thermoplastic polyimide varnish blended with fine particles of aluminum oxide (linear expansion coefficient: 7.2 ppm/° C.), fine particles of rutile type titanium oxide (linear expansion coefficient: 7.2 ppm/° C.), fine particles of boron nitride (linear expansion coefficient: 0.57 ppm/° C.), fine particles of silicon oxide (linear expansion coefficient: 0.55 ppm/° C.), or fine particles of polyetheretherketone (PEEK, linear expansion coefficient: 45 ppm/° C.) as the filler, was calculated. The linear expansion coefficient of the thermoplastic polyimide layer containing no filler was set to be 40 ppm/° C. Table 4 indicates the calculation results of the linear expansion coefficients.

TABLE 4

| TPI blending amount (wt %) | Blending amount (wt %) | Fine particles Material | | | | |
|---|---|---|---|---|---|---|
| | | Aluminum oxide | Titanium oxide | Boron nitride | Silicon oxide | PEEK |
| 100 | 0 | 40.0 | 40.0 | 40.0 | 40.0 | 40.0 |
| 90 | 10 | 36.7 | 36.7 | 36.1 | 36.1 | 40.5 |
| 80 | 20 | 33.4 | 33.4 | 32.1 | 32.1 | 41.4 |
| 70 | 30 | 30.2 | 30.2 | 28.2 | 28.2 | 42.5 |
| 60 | 40 | 26.9 | 26.9 | 24.2 | 24.2 | 43.5 |
| 50 | 50 | 23.6 | 23.6 | 20.3 | 20.3 | 44.2 |
| 40 | 60 | 20.3 | 20.3 | 16.3 | 16.3 | 44.7 |
| 30 | 70 | 17.0 | 17.0 | 12.4 | 12.4 | 44.9 |
| 20 | 80 | 13.8 | 13.8 | 8.5 | 8.4 | 45.0 |
| 10 | 90 | 10.5 | 10.5 | 4.5 | 4.5 | 45.0 |

As indicated in Table 4, as for the thermoplastic polyimide layer that contains, as the filler, the fine particles of aluminum oxide, titanium oxide, boron nitride, and silicon oxide which are inorganic materials, the linear expansion coefficient can be adjusted in a wide range depending on the blending amount of the filler. For example, when the thermoplastic polyimide layer contains approximately 40 to 50 wt % of fine particles of aluminum oxide, approximately 40 to 50 wt % of fine particles of titanium oxide, approximately 30 to 40 wt % of fine particles of boron nitride, or approximately 30 to 40 wt % of fine particles of silicon oxide, the linear expansion coefficient of the thermoplastic polyimide layer is approximately 25 ppm/° C. The fusion layer formed from such a thermoplastic polyimide layer is preferably used when aluminum alloy A2024 having a linear expansion coefficient of 25 ppm/° C. is used as the material of the flexure element. The reason thereof is that the residual stress caused by a thermal process such as the fusion-bonding process is prevented by making the linear expansion coefficient of the fusion layer substantially the same as that of the flexure element. As described above, the thermoplastic polyimide layer containing inorganic fine particles has an effect that the linear expansion coefficient of the fusion layer can be adjusted for the linear expansion coefficient of the flexure element. Meanwhile, when the thermoplastic polyimide layer contains the PEEK fine particles, the adjustable range of the linear expansion coefficient is narrow, as indicated in Table 4. This tends to make it hard to adjust the linear expansion coefficient of the fusion layer for that of the flexure element.

The present invention is not limited to the embodiments, provided that characteristics of the present invention can be obtained. The present invention includes any other embodiments which can be conceived in the range of technical ideas of the present invention.

The strain gage of the above embodiments may include a protective cover which covers the resistor.

In the strain gage of the above embodiments, the fusion layer may have a thickness of 3 to 12 μm. The resin material may be polyimide.

In the strain gage of the above embodiments, the thermoplastic polyimide layer may contain filler and/or a resin other than the thermoplastic polyimide. The resin other than the thermoplastic polyimide may be an epoxy resin or a phenol resin. The resin other than the thermoplastic polyimide may be an engineering plastic. The filler may be inorganic fine particles.

In the load sensor of the above embodiments, the strain gage may be attached to the flexure element via the fusion layer, and a portion, of a surface of the flexure element, which comes into contact with the fusion layer may be subjected to surface roughing.

In the load sensor of the above embodiments, the portion subjected to the surface roughing may have a surface roughness of 3 to 7 μm.

In the load sensor of the above embodiments, the fusion layer may have a thickness which is equal to or more than a surface roughness of the portion subjected to the surface roughing and is equal to or less than 12 μm.

In the method for manufacturing a strain gage of the above embodiments, the formation of the fusion layer may include coating the another surface of the substrate with thermoplastic polyamide acid varnish blended with an epoxy resin and baking the thermoplastic polyamide acid varnish.

As described above, the strain gage of one aspect of the present disclosure is thin and can make the manufacture process of the load sensor simpler.

The strain gage according to one aspect of the present disclosure can efficiently manufacture the load sensor that may prevent the creep phenomenon. Thus, the strain gage according to one aspect of the present disclosure can contribute to the increase in accuracy and the decrease in cost of the load sensor and a measurement device using the load sensor.

What is claimed is:
1. A strain gage, comprising:
a substrate formed from a resin material;
a resistor provided on a surface of the substrate; and a fusion layer provided on an opposite surface, of the substrate, to the surface on which the resistor is provided, wherein the substrate is a plate member which is formed from a polyimide, which has flexibility, and which has a thickness of 12 to 25 µm, and wherein the fusion layer is a thermoplastic polyimide layer having a thickness of 3 to 12 µm.

2. The strain gage according to claim 1, further comprising a protective cover which covers the resistor.

3. The strain gage according to claim 1, wherein the thermoplastic polyimide layer contains filler and/or a resin other than the thermoplastic polyimide.

4. The strain gage according to claim 3, wherein the thermoplastic polyimide layer contains the resin other than the thermoplastic polyimide, and the resin other than the thermoplastic polyimide is an epoxy resin.

5. The strain gage according to claim 3, wherein the thermoplastic polyimide layer contains the resin other than the thermoplastic polyimide, and the resin other than the thermoplastic polyimide is a phenol resin.

6. The strain gage according to claim 3, wherein the thermoplastic polyimide layer contains the resin other than the thermoplastic polyimide, and the resin other than the thermoplastic polyimide is an engineering plastic.

7. The strain gage according to claim 3, wherein the thermoplastic polyimide layer contains the filler, and the filler is inorganic fine particles.

8. A load sensor comprising:

a flexure element and the strain gage as defined in claim 1 which is attached to the flexure element.

9. The load sensor according to claim 8, wherein the strain gage is attached to the flexure element via the fusion layer, and a portion, of a surface of the flexure element, which comes into contact with the fusion layer is subjected to surface roughing.

10. The load sensor according to claim 9, wherein the portion subjected to the surface roughing has a surface roughness of 3 to 7 µm.

11. The load sensor according to claim 9, wherein the fusion layer has a thickness which is equal to or more than a surface roughness of the portion subjected to the surface roughing and is equal to or less than 12 µm.

12. The strain gage according to claim 1, wherein the fusion layer is configured to be attached to a flexure element, via heating and pressing of the fusion layer, with a peeling strength of 3 N/m or more.

13. The strain gage according to claim 1, wherein the strain gage is configured to be attached to a metallic plate flexure element via the fusion layer, the metallic plate flexure element being configured to be deformed depending on a weight of an object to be measured.

14. The strain gage according to claim 1, wherein the resistor is formed from a copper-nickel alloy.

15. A method for manufacturing a strain gage, comprising:

forming resistors on a surface of a substrate formed from a resin material;

forming a fusion layer, which is a thermoplastic polyimide layer having a thickness of 3 to 12 µm, on another surface of the substrate; and cutting the substrate to obtain strain gages each of which includes the resistor on the surface of the substrate cut and the fusion layer on the another surface of the substrate cut, wherein the substrate is a plate member which is formed from a polyimide, which has flexibility, and which has a thickness of 12 to 25 µm.

16. The method for manufacturing a strain gage according to claim 15, wherein the formation of the fusion layer includes coating the another surface of the substrate with thermoplastic polyamide acid varnish blended with an epoxy resin and baking the thermoplastic polyamide acid varnish.

17. A method for manufacturing a load sensor by using a strain gage and a metallic flat plate flexure element, wherein the metallic plate flexure element is configured to be deformed depending on a weight of an object to be measured, wherein the strain gage includes:

a substrate formed from a resin material;

a metallic resistor provided on a surface of the substrate, the metallic resistor including a pair of tabs and a gage sensing part extending zigzag from one of the tabs to the other of the tabs;

a fusion layer provided on an opposite surface, of the substrate, to the surface on which the resistor is provided; and a cover which is formed from a polyimide and which covers the gage sensing part, wherein the substrate is a plate member which is formed from a polyimide, which has flexibility, and which has a thickness of 12 to 25 µm, and wherein the fusion layer is a thermoplastic polyimide layer having a thickness of 3 to 12 µm, the method for manufacturing the load sensor comprising:

bringing the fusion layer of the strain gage into contact with a surface of the metallic flat plate flexure element;

heating a contact part in which the fusion layer is in contact with the surface of the metallic flat plate flexure element by using a heater arranged at a side, of the metallic flat plate flexure element, opposite to a side at which the contact part is defined; and pressing the strain gage toward the metallic flat plate flexure element concurrently with the heating of the contact part.

18. The method for manufacturing the load sensor according to claim 17, wherein a duration of the heating of the contact part and the pressing of the strain gate is 5 to 20 seconds.

* * * * *